March 1, 1955 H. G. HEINRICH 2,703,212
PARACHUTE WITH SLANTED GUIDE EXTENSIONS
Filed Dec. 15, 1953 3 Sheets-Sheet 1

INVENTOR.
HELMUT G. HEINRICH
BY
ATTORNEYS

March 1, 1955 H. G. HEINRICH 2,703,212
PARACHUTE WITH SLANTED GUIDE EXTENSIONS
Filed Dec. 15, 1953 3 Sheets-Sheet 2

INVENTOR.
HELMUT G. HEINRICH
BY
ATTORNEYS

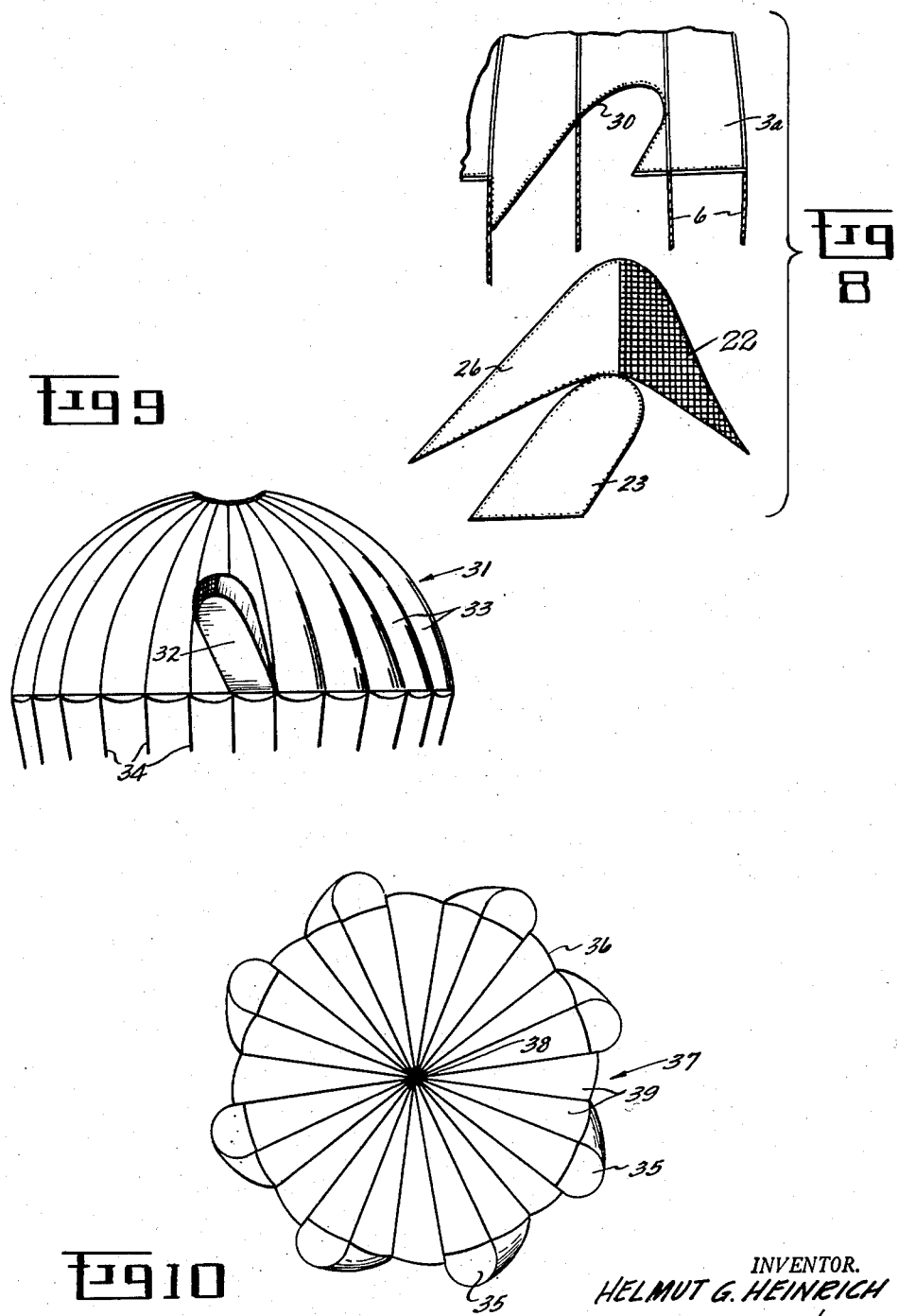

United States Patent Office 2,703,212
Patented Mar. 1, 1955

2,703,212

PARACHUTE WITH SLANTED GUIDE EXTENSIONS

Helmut G. Heinrich, Dayton, Ohio, assignor to Pioneer Parachute Company, Inc., Manchester, Conn., a corporation of Connecticut Application December 15, 1953, Serial No. 398,449

15 Claims. (Cl. 244—152)

(Granted under Title 35, U. S. Code (1952), sec. 266)

The invention described herein may be manufactured and used by or for the Government for governmental purposes without payment to me of any royalty thereon.

This invention relates to parachutes generally, and more particularly to dirigible or steerable and rotating parachutes, having for an object the provision of a highly stable parachute, including the types disclosed in my copending patent application, Serial No. 194,546 for Vented Sector Parachute, filed November 20, 1950, now issued as Patent No. 2,683,575, and includes inflatable and collapsible slanted guide surface extension means located at the opposite sides of the canopy, at or adjacent the skirt portion and projecting outwardly into the free air stream during descent, both slanting in the same direction relative to the descent axis, together with collapsing means therefor which is selectively operable by the parachutist, or by remote control means for selectively collapsing or removing either one, or the other, or both of the slanted air deflecting extensions means from the free air stream passing the parachute to selectively control the direction of horizontal and downward movement and the amount of the horizontal movement component of the parachute during its descent.

A further object is the provision of a rotating parachute having a canopy with one or more slanted extensions so arranged that their reaction forces are not opposed to each other, but constitute force couples which causes a positive rotation of the parachute about its descent axis while sinking simultaneously along its general path.

A still further object includes the provision of an arrangement of the slanted inflatable extensions whereby the slanted guide surface extension means are inflated by air entering the interior of the canopy below the skirt portion during its descent, together with separate collapsing means for the slanted guide surface extension means at opposite sides of the canopy for selectively collapsing either one or the other of the slanted guide surface extension means toward the exterior surface of the canopy for steering the parachute, and for collapsing both of the slanted guide surface extension means to remove their forward propulsion effect to permit a vertical descent of the parachute.

Another still further object of my invention is the provision of a pair of outwardly and downwardly inclined slanted inflatable guide surface air deflectors projecting outward from the opposite sides of the skirt portion of the canopy into the free stream, inclined in the same direction relative to the vertical descent axis of the canopy during its descent to deflect the air stream passing the opposite sides of the canopy skirt portion laterally in the same direction at opposite sides of the canopy, providing means for propelling the canopy forwardly in a determined direction, and separate control means for deflating each of said inflatable guide surface extensions to remove the propulsion effect thereof from the passing slip stream.

A still further object is the provision of a parachute canopy having a plurality of relatively spaced inverted U-shaped fabric extensions inclining radially downward and outwardly from the skirt portion, relative to the vertical descent axis, to leave air vent openings therebetween below the skirt portion, said U-shape fabric extensions each having an inclined guide surface air deflector panel inclined downwardly and inwardly from the outer end of the inverted U-shaped fabric extension, at least two of said U-shaped fabric extensions being located at opposite sides of the skirt portion and having their side walls projecting outwardly from the skirt portion and slanted downwardly in the same direction at opposite sides of the canopy relative to the vertical descent axis for deflecting the slip stream air passing the opposite sides of canopy laterally in the same direction to propel the canopy forwardly during its descent, said slanted extensions having venting means formed therein for relieving a reduced pressure area at the top and rear sides of the slanted extension caused by the passage of the free stream air upwardly along the rear sides of the slanted extensions during the descent of the parachute.

A still further object is the provision of a dirigible parachute having slanted inverted U-shaped inflatable extensions formed of relatively non-air porous material located in the path of the slip stream air passing the extensions in which the upper portions of the slanted extensions have a greater porosity to vent the low pressure area above the slanted extensions to relieve the low pressure area in the slip stream above and behind the slanted extensions which is blocked by the extension.

Other and further objects and advantages of the invention will become apparent from following description and accompanying drawings in which like reference characters refer to like parts in the several figures.

*Drawings*

Fig. 8 is a diagrammatic or exploded view showing the general shape of one of the blanks for the slanted guide surface extensions illustrated in Fig. 4 and a portion of the canopy cut out to receive the same.

Fig. 9 is a side view of a conventional canopy having slanted inflatable extensions not extending below the lower edge of the skirt.

Fig. 10 is a top plan view of a canopy having a plurality of slanted extensions, all similarly inclined, for rotating the parachute during its descent.

Figure 1:
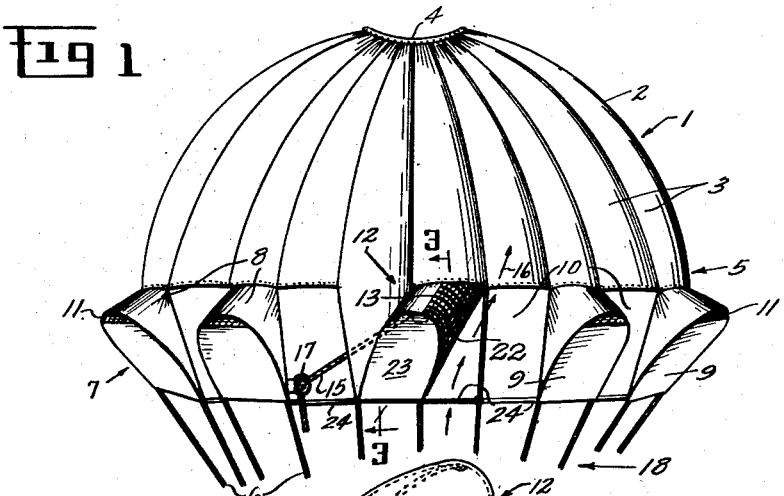
Fig. 1 is a fragmentary side elevation of a parachute incorporating my invention showing the same during descent.

Referring to Fig. 1 the reference numeral 1 indicates a parachute having a canopy 2 of somewhat hemispherical shape composed of radial segments or gores 3 secured together along their adjacent radial edges from the apex 4 to the skirt portion 5. Shroud lines 6 extend from the ends of the seams between the gores, inwardly and downwardly, adapted to be secured to a load to be suspended and lowered by the parachute. As shown, a plurality of guide surface extensions are spaced around the skirt portion as indicated at 7, each comprising an inverted U-shaped portion 8 having an upper end secured to the outer end of predetermined spaced gores with downwardly flared side edges secured to the shroud lines at the opposite sides of the gores, the inverted U-shaped portion inclining downwardly and outwardly as shown in the drawing, and in my copending patent application referred to above and terminating in upwardly and outwardly inclined guide surface panel 9 fitted and secured thereto. These panels 9 are spaced around the vertical descent axis of the canopy, with their lower edges extending between the shroud lines 6 at the lower ends of the U-shaped portions 8 and incline upwardly and outwardly into the free stream air passing the parachute during its descent deflecting the air outwardly at spaced points around the canopy to stabilize the parachute and tending to return the parachute to its vertical descent position and eliminate oscillation. These guide surface extensions 7 are spaced relative to each other to leave air venting openings 10 therebetween extending outwardly between the adjacent spaced shrouds at opposite side thereof. The juncture of the outer and upper ends of the guide surface panels 9 with the outer ends of the inverted U-shaped portions provide air spoiler edges above the ends of the panels. If desired air vent openings may be provided in the upper outer edges of the guide surface panels as indicated at 11. The air entering the interior of the canopy from below during descent inflates these guide surface extensions to dispose the outwardly inclined guide surface portions 9 in their proper air deflecting position, as will be understood, during the downward descent of the canopy through the air.

In my improved parachute at least two of the guide surface extensions located substantially at opposite sides of the canopy, which extensions instead of inclining downwardly and inwardly are also slanted laterally in the same direction relative to the vertical descent axis. In Fig. 1 only one of the slanted guide surface extensions is visible, the other one slanted extension being at the opposite side of the canopy cannot be seen because it is directly in line with the one that is shown. These slanted guide surface extensions are indicated generally at 12, each comprising an upper inverted U-shaped slanted fabric portion 13 with its outer end terminating in a guide surface panel receiving opening which is closed by an outwardly and upwardly inclined guide surface panel 23 with its lower edge extending across the space adjacent shroud lines. The free stream air passing upwardly and striking the slanted panel surface produces stabilization and non-oscillation of the parachute in the same manner as the panels 9. The opposite sides of the U-shaped slanted portions 13 at opposite sides of the canopy are inclined in the same direction relative to the vertical descent axis of the canopy and each other and deflect the passing free stream air laterally as shown by the arrows 16 in Fig. 1. This produces a lateral deflection of the air at opposite sides of the canopy and a resultant forward movement component on the canopy, advancing the canopy in a predetermined direction as it descends. Air entering the canopy from below extends the slanted extensions into the free air stream. Means are provided for selectively collapsing one, or the other, or both of the slanted extensions toward the exterior surface of the canopy skirt portion.

Collapsing pull cables 15 are provided each having one end connected at the upper extremity of the slanted panel 16 and passing interiorly of the canopy laterally through a ring 17 and then downwardly where they can be selectively tensioned by the parachutist, or, if desired, by radio controlled tensioning mechanism. Pulling of one of the cables 15 draws the connected slanted extension inwardly and laterally toward the outer surface of the canopy to remove that slanted extension from the passing free air stream. Separate collapsing cables are provided one for the slanted extensions at each side of the canopy. Pulling the cable 15 on the right hand side of the canopy collapses the right hand slanted extension and the other or left hand slanted extension will then exert forward stress on the left hand side of the canopy causing the canopy to rotate toward the right, facing in the direction of arrow 18. Collapsing the other or left hand slanted extension will rotate the canopy to the left, providing complete dirigibility for the canopy. Pulling both cables 15 and collapsing the slanted guide surface extensions 13 at both sides of the canopy or partially collapsing them removes, or partially removes, the forward movement component from the canopy thus regulating the rate of forward movement of the canopy as well as its direction during its descent from maximum to zero (in still air).

Referring again to Figs. 1 and 3 the air stream passing the "lower" side of the slanted extensions and being deflected laterally thereby would normally tend to follow the curved top of the U-shaped portion, which is undesirable. For one reason, it would tend to retard the forward or turning movement of the parachute during its descent. In order to relieve this low pressure area and prevent the slip stream from following the curved top of the U-shaped portions of the slanted guide surface extensions these upper portions, starting about half way up on the "lower" side and terminating at approximately the top, are partially vented, or made of material having a greater porosity than the rest of the extension, or an "air spoiler flap" can be provided. This can be understood with reference to the blanks which form the extensions, somewhat after the manner illustrated in Fig. 8. This results also in a better and firmer inflation of the extensions, and results in a better lateral deflection of the air stream by the forward or undersides of the slanted U-shaped portions of the extensions, thus producing a greater advance and steering control movement of the parachute during its descent. Since the "upper" sides of the U-shaped portions of the slanted extensions do not contact the passing slip stream air it is preferable to vent at least the upper portion of the space behind this portion to the interior of the parachute, for instance by spacing the adjacent regular (non-slanted) guide surface extension therefrom to allow the air to enter this space between the adjacent connected shroud lines. These front or lower sides of the slanted extensions can be made of slightly more porous cloth if desired, as indicated at 22 in Figs. 1, 4, 5 and 7.

Figure 2:
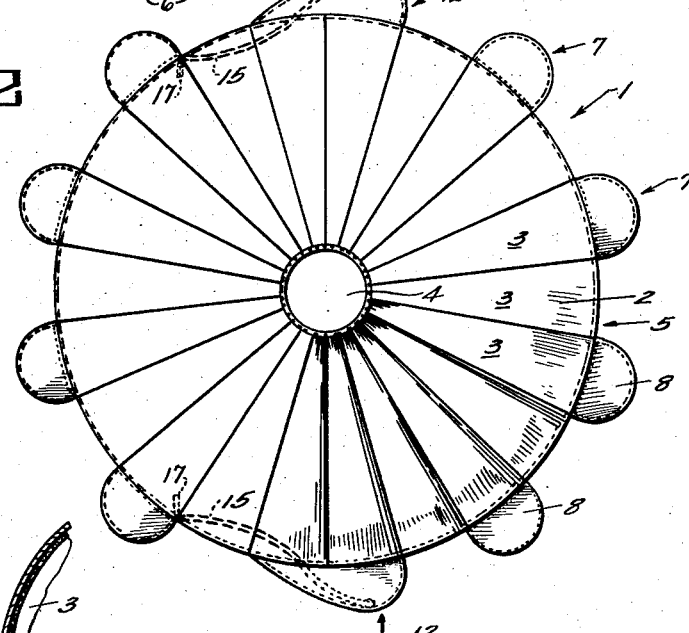
Fig. 2 is a top plan view of the canopy shown in Fig. 1.
Figure 3:
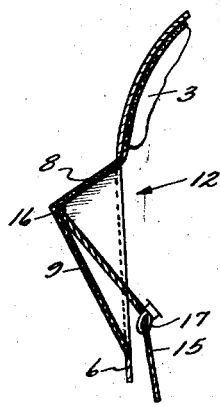
Fig. 3 is an enlarged fragmentary sectional view taken about on line 3—3 of Fig. 1.

In Figs. 1 to 3 the slanted extensions 13 incline downwardly from the lower edge of the canopy skirt portion, also only one slanted extension is employed on each of the diametrically opposite sides of the canopy.

Figure 4:
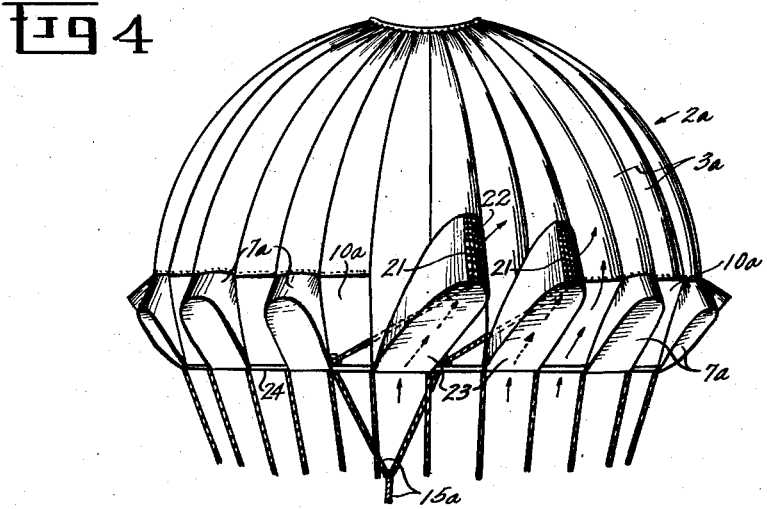
Fig. 4 is a view similar to Fig. 1 illustrating a modified arrangement of slanted guide surface extensions.

Fig. 4 illustrates a slight modification in two respects, although the general shape of the slanted guide surface lateral air deflecting panel means, indicated generally at 21—21 may be similar to the slanted extensions 13 shown in Figs. 1 to 3. One difference is that a plurality or group of the slanted air deflectors or extensions is provided on each side of the canopy skirt portion, both groups slanting upwardly in the same direction at opposite sides of the canopy relative to its vertical descent axis, the other difference being that the extensions are much longer and extend upwardly above the lower edge of the skirt. These extensions 21, like those shown in Fig. 1, are inflatable by the air entering the canopy from below and are collapsible toward the exterior of the skirt as a group by the cable means 15a, 15b. When both groups of extensions 21 are inflated and project out into the passing air stream, the air deflected thereby propels the parachute forwardly.

Collapsing one group rotates or steers the parachute to change its direction. Collapsing both groups of the slanted extensions removes the forward (or turning) movement components completely to allow the parachute to descend vertically in much the same manner as in the form shown in Fig. 1 except that the greater length and increased number should provide a more efficient dirigible parachute.

Figure 5:
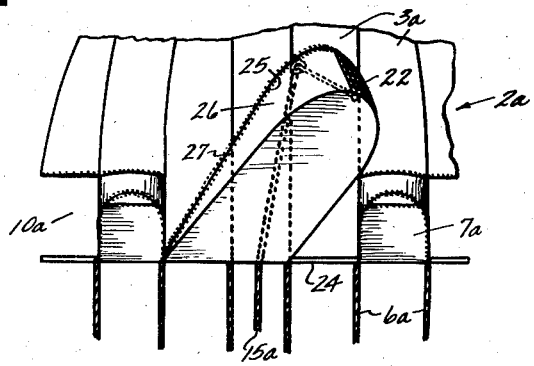
Fig. 5 is an enlarged fragmentary side view of a further modified arrangement of one of the slanted collapsible guide surface extension extended across several panels and illustrating the opposite sides of the upper portion of the extension varying in the degree of porosity.

Fig. 5 illustrates single slanted extensions at opposite sides, each having not only a greater length than the regular stabilizing extensions but is also wider. In Figs. 4 and 5 the canopy is indicated at 2a, having gores 3a with the regular stabilizing guide surface extensions 7a arranged below alternate gores 3a and leave the vent openings 10a therebetween. The shroud or load suspension lines 6a are connected to the opposite sides of the extensions 7a as shown, the lower ends of the gores being shaped to receive the slanted extensions 21 therein with their cooperating edges securely fastened to receive inflating air entering the interior of the canopy during its descent to thus inflate and project the slanted extension into the air stream.

In Fig. 4 the area of greater porosity is indicated at 21, while the stabilizing outwardly and laterally inclined guide surface panel is indicated at 23. If desired, suitable tie tapes such as indicated at 24 may be provided to retain the respective portions of the parachute in place during opening and descent.

In the form shown in Fig. 5 the lower end of the slanted extension straddles two shroud lines and the gores are suitably cut out as at 25 to receive the edges of the inverted U-shaped portion 26 and are stitched together along the adjoining edges as indicated at 27; the slanted extension collapsing pull cable means being indicated at 15a.

Figure 6:
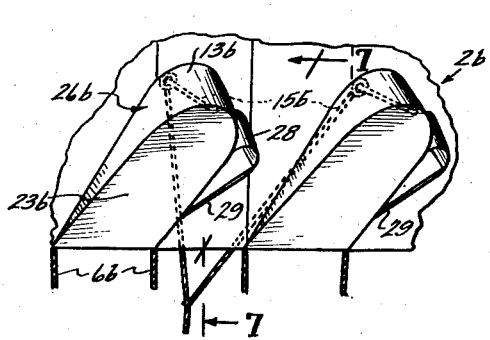
Fig. 6 is a fragmentary side elevation of a further modification in which a flap member is used at one side of the slanted extension to break the flow of air around the top portion to relieve the low pressure area at the top.
Figure 7:
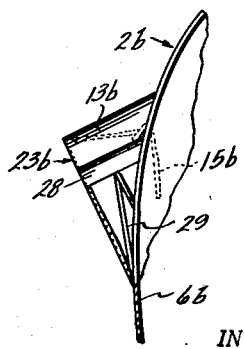
Fig. 7 is a side elevation of the extension and flap shown in Fig. 6 taken about on line 7—7 of Fig. 6.

In the modification illustrated in Figs. 6 and 7 the canopy is indicated at 2b, and the inserted slanted guide surface air deflectors or inflatable extensions are indicated at 13b, and comprise the inverted U-shaped portions 26b and the flat end closure panels 23b, inclining outwardly and laterally from their lower edges, and connected at their lower ends to the shroud lines 6b.

The collapsing cable means for selectively removing the extensions from the "air stream" are indicated at 15b. The primary difference between the modification shown in Figs. 6 and 7 and the other forms of my invention is the means for preventing the air stream from following the curved upper surface of the U-shaped portion 13b. A flexible elongated fabric flap member 28 is provided, secured along one edge to the "lower" side of each of the U-shaped portions, where the curve of the top begins, the opposite edge of the flap being tied down in place as shown by tie cords or tapes 29. The air stream striking these flaps 28 extends them as shown to provide an obstruction in the path of the slip stream, forming a break or air spoiler edge, preventing the air from following the curved upper surface.

In conclusion the slanted extensions 13 like the regular stabilizing guide surface extensions 7 are formed of fabric and are fully collapsible, thus forming no increased bulk in the packed parachute. They are inflatable to their extended or operative positions by the air entering the parachute during its descent and form a very simple and satisfactory means for controlling the direction of the descent of the parachute.

Fig. 8 illustrates a portion of the canopy having the cutaway portion 30 shaped to receive the slanted extension, the U-shaped portion 26 and the guide surface panel 23 being separated and shown in blank form.

Fig. 9 is a side elevation of a further modification in which the slanted extensions are incorporated in a conventional parachute.

Fig. 10 is a top plan view of a parachute of a conventional type in which the slanted extensions have been incorporated for rotating the parachute in one direction.

In Fig. 9 a conventional type of parachute 31 of the so-called "extended skirt" type is disclosed incorporating my invention therein, the slanted extensions being indicated at 32 and are of the general configuration shown in the Figure 5. The slanted extensions are located in predetermined positions around the skirt portion and do not extend below the bottom edge of the skirt and are comparatively large, inclining over two or more of the gores 33. The shroud lines are indicated at 34.

In some instances, for instance, in cargo parachutes, it may be desirable to rotate the parachute on its descent axis during descent. One advantage is that the rotation or spinning tends to speed the base (and correspondingly) flatten the top, providing a greater speed and, therefore, a slower descent. In the top plan view shown in Figure 10 a plurality of slanted extensions 35 are incorporated in a circular somewhat conventional canopy 36, all of the extensions 35 inclining upwardly from the lower edge or skirt portion 37 of the canopy, in opposite direction at opposite side of the canopy relative to the vertical descent axis 38, the radial gores being indicated at 39 and cut out as indicated previously to receive the inner edges of the extension 35 permitting inflation by air entering the canopy from below. This arrangement provides not only means to stabilize the parachute during its descent but the air stream passing the extensions spins the canopy on its axis with a corresponding spreading of the skirt portion 37 and flatting of the top, offering a greater coverage area and, therefore, either a slower descent, or for a desired rate of descent the diameter of the canopy can be made smaller, thus reducing the amount of fabric necessary and as a result both the bulk and cost will be less. This type of parachute would be primarily used for cargo drops where rotation is not necessarily objectionable although a swivel connection between the load suspension end of the parachute and the load, if desired, is contemplated to permit the parachute to reach its maximum rotational speed earlier and either eliminate or reduce the rotation of the load during its descent.

My improved slanted extensions, when mounted on the opposite sides of the skirt portion have been found to produce another important result during landing. Parachutes so equipped have an inherent tendency to turn into the wind, particularly when the wind is gusty or variable, thus they will drift toward the direction of the wind automatically. By arranging the wearer's seat or sling accordingly, a landing can be made automatically with the wearer facing "down wind," which is the most favorable position to avoid landing injuries under drifting conditions. Of course, by selectively collapsing the slanted extensions the parachute can be steered or drifted under selective control of the operator at any time, but when slanted extensions are released, especially when approaching the ground where the wind is gusty or its velocity varies, there is a decided tendency for the parachute to face or turn its gliding direction automatically into the direction of the wind, thus the "glide" of the parachute can be made to automatically compensate for drift which is a desirable feature.

One explanation for this automatic turning into the wind feature appears to be that when the parachute is not turned into the direction of the wind, and the wind is gusty or variable in intensity, as it usually is nearer the earth, the inertia of the parachute causes a variation in the symmetry of flow of the air around the slanted extension on the far side of the canopy as compared to the air flow around the slanted extension of the near or up air stream side. Due to air gusts passing the parachute and the inertia of the parachute, the slanted extension (obstruction) on the near or up stream side of the canopy will receive greater wind impact during gusts than the other similar oppositely facing extension on the other or down stream side of the canopy. Consequently the greater air impact on the upstream slanted extension will tend to rotate the canopy until both slanted extensions are disposed equally in a plane perpendicular to the wind direction with glide direction facing wind direction. When the wind is steady there is probably no tendency for the parachute to turn automatically into the wind unless the slanted extensions are selectively collapsed.

It can therefore be seen that if the wind velocity and forward movement of the parachute are about equal the parachute will descend substantially vertical in a wind and the wearer can automatically face in down stream of wind direction.

The drawings illustrate several forms of the invention, primarily for exemplary purposes, it being obvious that changes may be made in the details of the construction and the arrangement as shown and described without departing from the spirit of the invention as contemplated by the appended claims.

What is claimed is:

1. In a dirigible parachute, a canopy having a vertical descent axis and a convex outer surface terminating in a peripheral skirt portion extending downwardly in the general direction of said vertical descent axis, inclined collapsible air deflector means projecting outwardly from the opposite sides of the canopy and inclining upwardly in the same general direction relative to the said vertical descent axis from the lower edge of the opposite sides of the skirt portion, to deflect the air stream passing the opposite sides of the skirt portion substantially tangentially in the same general direction, shroud lines connected to the canopy and inclining downwardly and inwardly from spaced points around said peripheral skirt portion toward said vertical descent axis for suspension of a load to be lowered by the parachute, collapsing means for selectively collapsing either one or the other or both of said inclined air deflector means to selectively remove the tangential air deflecting effect thereof from the air passing the said air deflecting means, said collapsing means extending downwardly and arranged to be selectively actuated at a point near the suspended load.

2. In a parachute, a canopy having a vertical descent axis and a convex outer surface terminating in a peripheral skirt portion extending downwardly in the general direction of said vertical descent axis, an inclined collapsible air deflector means projecting outwardly from the side of the canopy and inclining upwardly and tangentially relative to the periphery of the canopy from the lower edge of the skirt portion, to deflect the air stream passing the side of the skirt portion substantially tangentially, shroud lines connected to the canopy and inclining downwardly and inwardly from spaced points around said peripheral skirt portion toward said vertical descent axis for suspension of a load to be lowered by the parachute.

3. In a dirigible parachute having a vertical descent axis, a canopy having a skirt portion and an intermediate crowned portion having an outer convex curvature encircling the descent axis, a pair of inflatable, collapsible, inclined tangential air deflectors projecting outwardly from the skirt portion at opposite sides of the canopy inclining upwardly and tangentially relative to the canopy periphery at the lower edge of the skirt portion in the same direction relative to said vertical descent axis and to the slip stream air passing the opposite sides of the exterior of the skirt portion during the descent of the canopy, said inflatable air deflectors each having an air inlet opening in communication with the interior of the canopy during descent, whereby a portion of the air entering the canopy from below during descent inflates and extends said inclined air deflector means into the air stream passing the skirt portion, and separate selectively operable collapsing means connected to said air deflector means for selectively collapsing either one, or both, of said inflatable and collapsible air deflectors to selectively reduce or remove the air deflecting effect thereof from the air stream passing the same during the descent of the parachute.

4. In a dirigible parachute having a vertical descent axis, a canopy having a skirt portion and an intermediate crowned portion having an outer convex curvature encircling the descent axis, a pair of inflatable, collapsible inclined tangential air deflectors projecting outwardly from the skirt portion at opposite sides of the canopy inclining upwardly and tangentially relative to the canopy periphery at the lower edge of the skirt portion in the same direction relative to the slip stream air passing the exterior of the skirt portion during the descent of the canopy, said inflatable air deflectors each having an air inlet opening in communication with the interior of the canopy during descent, whereby a portion of the air entering the canopy from below during descent, inflates and extends said inclined air deflector means into the air stream passing the skirt portion.

5. In an improved parachute, a flexible canopy having a peripheral skirt portion and an intermediate convex outer surface therebetween, said skirt portion having an inclined guide surface portion, inclining downwardly and inwardly toward the vertical descent axis of the canopy, including a pair of spaced slanted guide surface extension members inclining upwardly and laterally at opposite sides of said skirt portion in substantially the same general direction relative to the vertical descent axis of the canopy, for deflecting the air stream passing the opposite sides of the skirt portion laterally in the same direction during descent of the canopy and means for selectively removing the air deflecting effect of either one or the other or both of said slanted guide surface members from the passing air stream during the descent of the canopy.

6. In an improved parachute, a flexible canopy having a peripheral skirt portion and an intermediate convex outer surface therebetween, said skirt portion having an inclined guide surface portion, inclining downwardly and inwardly toward the vertical descent axis of the canopy, including spaced slanted guide surface extension members inclining upwardly and laterally at opposite sides of said skirt portion relative to the vertical descent axis of the canopy, for deflecting the air stream passing the skirt portion in a tangential direction relative to the canopy periphery during descent of the canopy.

7. In an improved dirigible parachute, a canopy having a descent axis, comprising an outer convex surface terminating in an annular skirt portion extending downward in the general direction of the descent axis, slanted guide surface extension members projecting outwardly at substantially the opposite sides of the canopy skirt portion and slanting upwardly in the same general direction away from a plane through the said descent axis, said slanted extensions each comprising an upwardly and outwardly inclined guide surface panel portion disposed in the path of the air stream passing the skirt portion of the canopy, said extensions having median planes inclining laterally in the same general direction relative to said descent axis, each comprising a collapsible inverted U-shaped flexible air closure panel therefor surrounding said upwardly and outwardly inclined guide surface portions, and connected to the edge of the guide surface portion, and extending between said connected edge and the skirt portion to close the space above and between said inclined guide surface panel and the canopy, and being connected at its opposite edge throughout its length to the canopy skirt portion, and selectively operable collapsing means connected to each of said slanted inclined guide surface panel portions for collapsing said guide surface portions and the intermediate U-shaped closure panels against the skirt portion to selectively withdraw each of said slanted guide surface portion and its connected closure panel portion out of the air stream passing the skirt portion during the descent of the canopy.

8. In an improved stabilized dirigible parachute, a canopy, suspension lines which extend individually downward from spaced apart points at the peripherial edge of the canopy to the load, and circumferentially spaced, air-deflecting elements extending downwardly from the peripheral edge of the canopy, each air-deflecting element having at its lower edge a substantial width and being attached at its spaced apart lower corners to two separate suspension lines in such a manner that the opposite sides of the air-deflecting elements are held apart by the suspension lines when the parachute is in use, to form at and about the peripherial edge of the canopy alternate air deflecting and air venting zones which serve to increase the turbulence of the air flowing outwardly from beneath the canopy during descent of the parachute, said air deflecting elements comprising loose, air pocketing members having downwardly and outwardly extending upper portions and downwardly and inwardly extending lower portions so as to present, when the parachute is in use, spaced outwardly projecting air-retarding pockets separated by intermediate relatively unobstructed air venting zones, at least one of said air deflecting elements inclining laterally relative to a vertical plane through the descent axis and that air deflecting element so as to deflect the passing air stream at the skirt portion of the canopy in substantially tangential direction to the skirt portion to produce a rotative torque component on the canopy about its descent axis.

9. In a dirigible parachute having a descent axis, an inflatable canopy having an annular skirt portion and a convex outer top portion, shroud lines extending downwardly and inwardly from said skirt portion toward the descent axis for the suspension therefrom of a load to be lowered by the parachute, outwardly and laterally inclined guide surface panels connected at their lower edges between two groups of predetermined spaced adjacent shroud lines located at substantially opposite sides of the canopy in downwardly spaced relation to the lower edge of said skirt portion, said guide surface panels each inclining outwardly, upwardly and laterally away from the skirt portion and formed with a substantially inverted U-shaped upper edge, each panel having a median line, located parallel to a plane passing through the descent axis of the canopy at an inclined angle thereto, inverted U-shaped elongated lateral air deflector closure panels closing the space between the upwardly and outwardly extending edge of each inclined slanted guide surface panel and the surface of the canopy and connected at their outer edges to the edge of the inclined guide surface panels and at their inner edges to the surface of the canopy and the adjacent shroud lines, to provide a pair of collapsible elongated U-shaped opposed tangential air deflectors at the opposite sides of the canopy skirt portion having the sides thereof slanting upwardly in the same direction, relative to the said descent axis for deflecting the air slip stream passing said air deflectors laterally in the same direction during the descent of the canopy.

10. Apparatus as claimed in claim 9 including collapsing means connected to said slanted guide surface extension members for drawing the upper ends thereof inwardly toward the canopy surface, to remove the similarly inclined tangential air deflecting portions thereof out of the air stream passing the canopy during the descent thereof.

11. Apparatus as claimed in claim 9 in which the lower portions of the inclined tangential air deflecting portions of said inverted U-shaped inclined closure inserts in the air stream passing the canopy during its descent is of a lesser predetermined porosity than the upper inclined tangential air deflecting surfaces to permit the escape of air through the greater porosity portions to relieve the reduced air pressure above the curved upper portion and increase the air deflection produced by the slanted air deflector during the descent of the canopy.

12. In an improved parachute, a canopy, suspension lines extending individually downward from spaced apart points at the periphery of the canopy, a plurality of inclined circumferentially spaced tangential air-deflector elements projecting outwardly from the skirt portion of the canopy into the air stream passing the periphery during descent, said inclined air deflecting elements each comprising a loose air pocketing member having a downwardly and outwardly extending laterally inclined upper portion and a connected downwardly and inwardly extending similar laterally inclined lower portion, said canopy being formed with a slanted opening in the skirt portion to receive the inner edge of said upper portion therein, said upper portion being secured along said inner edge of the edge of opening to dispose said upper and lower portion with a median line therethrough disposed in an inclined plane through the vertical descent axis of the canopy, for deflecting the air stream passing the lower side of inclined upper portion at the periphery of the canopy in a direction substantially tangential to the periphery of the canopy for applying a rotative torque to the canopy about its vertical descent axis while the canopy is in use.

13. Apparatus as claimed in claim 12 in which the extensions are all inclined upwardly in the same tangential direction relative to the periphery of the canopy.

14. Apparatus as claimed in claim 12 in which the extensions projecting from the peripherial portion at opposite sides of the canopy are inclined upwardly in opposite tangential directions for applying opposing rotative forces to the canopy at said opposite sides of the descent axis and applying corresponding equal propulsion forces to the canopy at opposite sides of the descent axis of the canopy.

15. Apparatus as claimed in claim 14 including selectively operable collapsing means connected between said tangential air deflecting means and the canopy for selectively collapsing the tangential air-deflecting means on one side of the canopy or the other side for effecting a rotative torque on the canopy about its descent axis in one tangential direction relative to said periphery or in the opposite tangential direction, or collapsing the said tangential air-deflecting means on both sides of the canopy to eliminate the application of all rotative torque and all propulsive torque of said inclined extensions from the canopy during its descent.

References Cited in the file of this patent

UNITED STATES PATENTS

| | | |
|---|---|---|
| 2,384,416 | Derry | Sept. 4, 1945 |
| 2,462,864 | Heinrich | Mar. 1, 1949 |